United States Patent
Shibuno

(10) Patent No.: US 10,003,736 B2
(45) Date of Patent: Jun. 19, 2018

(54) IMAGE PICKUP DEVICE

(71) Applicant: Panasonic Intellectual Property Management Co., Ltd., Osaka (JP)

(72) Inventor: Koji Shibuno, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days. days.

(21) Appl. No.: 15/604,749

(22) Filed: May 25, 2017

(65) Prior Publication Data

US 2017/0264816 A1 Sep. 14, 2017

Related U.S. Application Data

(63) Continuation of application No. PCT/JP2016/002199, filed on Apr. 26, 2016.

(30) Foreign Application Priority Data

May 14, 2015 (JP) .................................. 2015-099353

(51) Int. Cl.
- H04N 5/222 (2006.01)
- H04N 5/232 (2006.01)
- G02B 7/36 (2006.01)

(52) U.S. Cl.
CPC .......... *H04N 5/23212* (2013.01); *G02B 7/36* (2013.01); *H04N 5/23216* (2013.01); *H04N 5/23293* (2013.01)

(58) Field of Classification Search
CPC .......... H04N 5/23212; H04N 5/23216; H04N 5/23293; G02B 7/36; G06T 7/11

(Continued)

(56) References Cited

U.S. PATENT DOCUMENTS

| 2010/0220230 A1* | 9/2010 | Kim ..................... G03B 13/36 348/349 |
| 2012/0257102 A1* | 10/2012 | Nakagawara ........ H04N 5/2256 348/371 |
| 2014/0333824 A1* | 11/2014 | Xiu ...................... H04N 5/2351 348/353 |

FOREIGN PATENT DOCUMENTS

| JP | 11-088760 | 3/1999 |
| JP | 2004-198699 | 7/2004 |

(Continued)

OTHER PUBLICATIONS

International Search Report of PCT application No. PCT/JP2016/002199 dated Jul. 19, 2016.

*Primary Examiner* — Yogesh Aggarwal
(74) *Attorney, Agent, or Firm* — Renner Otto Boisselle & Sklar, LLP

(57) ABSTRACT

An image pickup device includes an optical system, an image pickup unit that captures a subject image through the optical system and generates a captured image, and a controller that calculates an evaluation value from a region corresponding to an AF frame in the captured image and drives the optical system according to the calculated evaluation value to perform an automatic focus operation. The controller includes a normal illumination mode set when brightness of the captured image is a predetermined value or more, and a first low-illumination mode and a second low-illumination mode set when the brightness of the captured image is less than the predetermined value. In the first low-illumination mode, a first automatic focus (AF) frame that is larger than an AF frame set in the normal illumination mode is set. In the second low-illumination mode, a second AF frame that is smaller than the first AF frame is set.

7 Claims, 10 Drawing Sheets

(58) Field of Classification Search
USPC ....... 348/370–374, 335, 340, 345, 348, 350, 348/352
See application file for complete search history.

(56) References Cited

FOREIGN PATENT DOCUMENTS

| | | |
|---|---|---|
| JP | 2006-195037 | 7/2006 |
| JP | 2011-107550 | 6/2011 |
| JP | 2014-106324 | 6/2014 |

* cited by examiner

First low-illumination AF

Second low-illumination AF

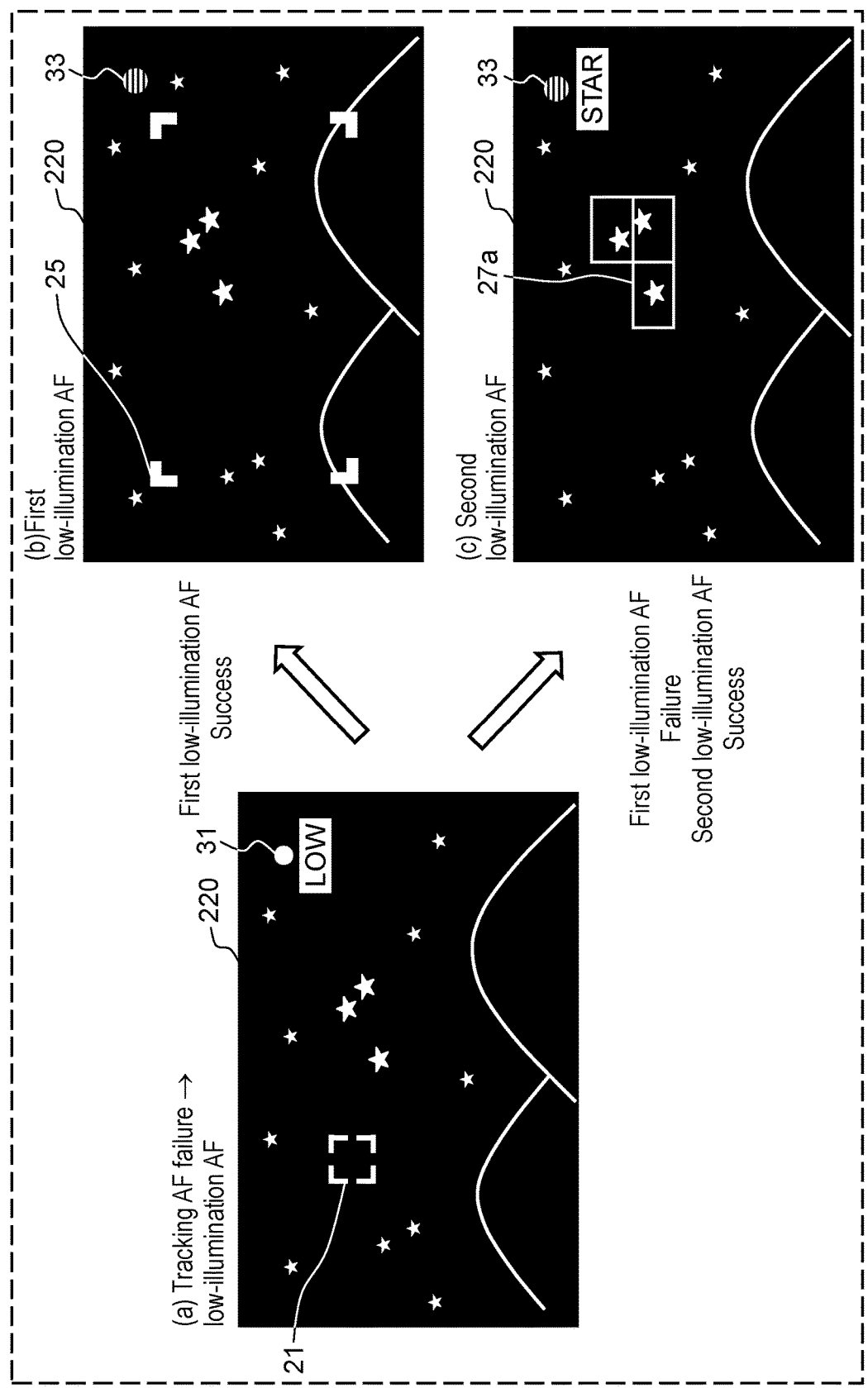

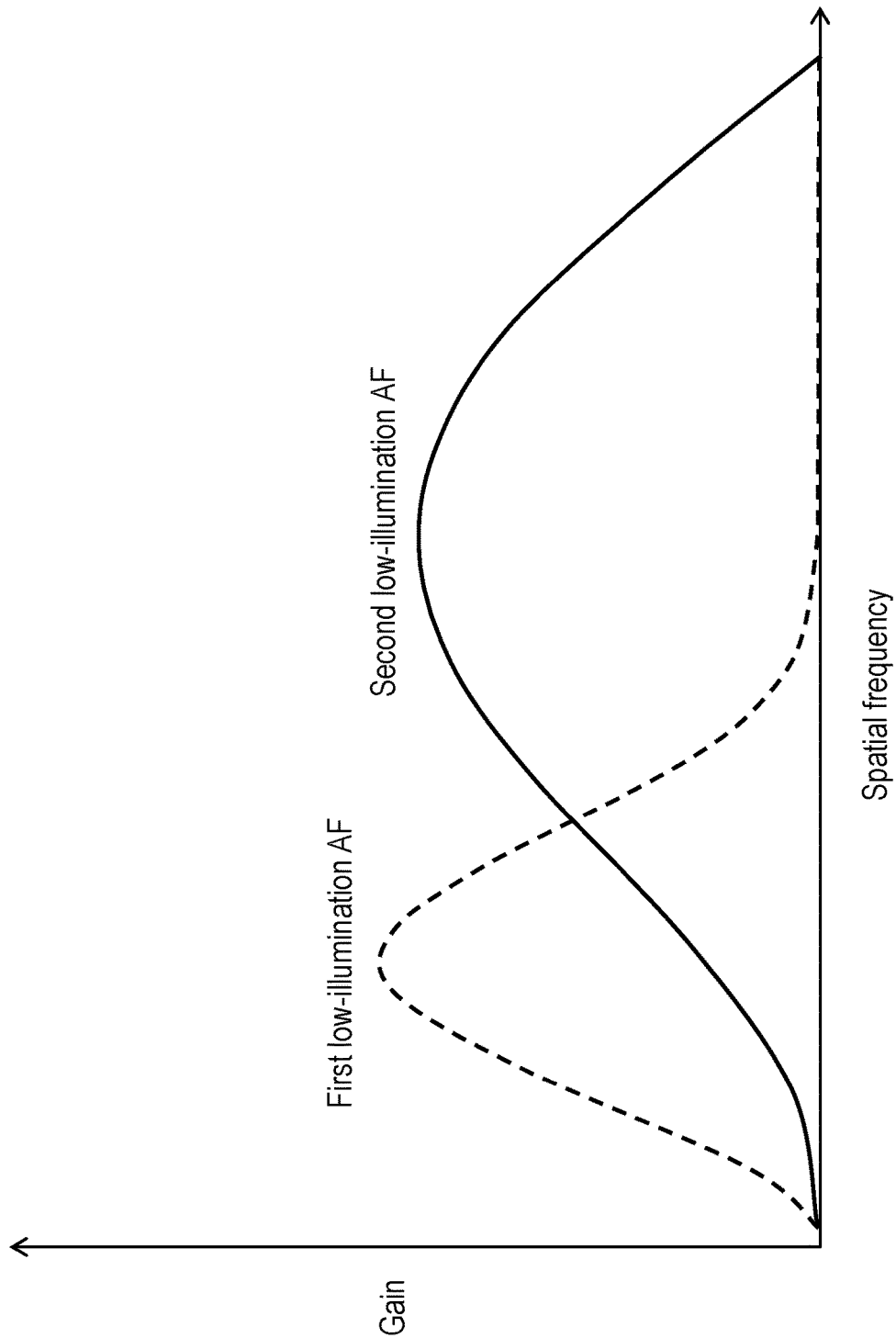

IMAGE PICKUP DEVICE

BACKGROUND

1. Technical Field

The present disclosure relates to an image pickup device having an automatic focus function.

2. Description of the Related Art

A typical automatic focusing method for a digital camera is contrast AF that involves calculating a contrast value of a partial region in a captured image, obtaining a position in focus according to the contrast value, and driving a focus lens to the position in focus. With regard to such contrast AF, when an image of a dark subject such as a night sky is captured, the position in focus is not obtained correctly in many cases since a satisfactory contrast value is not obtained from the captured image (refer to Unexamined Japanese Patent Publication No. 2004-198699)

SUMMARY

In an aspect of the present disclosure, an image pickup device includes an optical system, an image pickup unit that captures a subject image formed through the optical system and generates a captured image, and a controller that calculates an evaluation value from a region corresponding to an AF frame in the captured image and drives the optical system according to the calculated evaluation value to perform an automatic focus operation. The controller includes a normal illumination mode set when brightness of the captured image is a predetermined value or more, and a first low-illumination mode and a second low-illumination mode set when the brightness of the captured image is less than the predetermined value. In the first low-illumination mode, a first automatic focus (AF) frame that is larger than an AF frame set in the normal illumination mode is set. In the second low-illumination mode, a second AF frame that is smaller than the first AF frame is set.

The image pickup device of the present disclosure can obtain a contrast value that changes largely for a small light source, since the second AF frame with the smaller size is set in the second low-illumination AF. Therefore, the automatic focus operation can be performed even for a scene that has a low-illumination background as a whole but includes a bright light source in part, such as a night sky luminous with stars, or a dark night scene including small lights in a city.

BRIEF DESCRIPTION OF THE DRAWINGS

FIG. 9 is a diagram for illustrating switching of indication of AF frames and in-focus icons that are displayed on a display monitor of the digital camera; and FIG. 10 is a diagram illustrating characteristics of a filter of the first low-illumination AF and characteristics of a filter of the second low-illumination AF.

DETAILED DESCRIPTION

Exemplary embodiments will be described in detail below with reference to drawings as appropriate. However, a description more detailed than necessary may be omitted. For example, a detailed description of already well-known matters and a repeated description regarding substantially identical components may be omitted. This is intended to avoid making the following description unnecessarily redundant and to make it easier for a person skilled in the art to understand the exemplary embodiments.

It is to be noted that the accompanying drawings and the following description are provided in order for a person skilled in the art to fully understand the present disclosure, and do not intend to limit the subject described in the appended claims.

Exemplary embodiments of an image pickup device according to the present disclosure will be described below with reference to the drawings.

First Exemplary Embodiment

1. Configuration of Digital Camera

Figure 1:
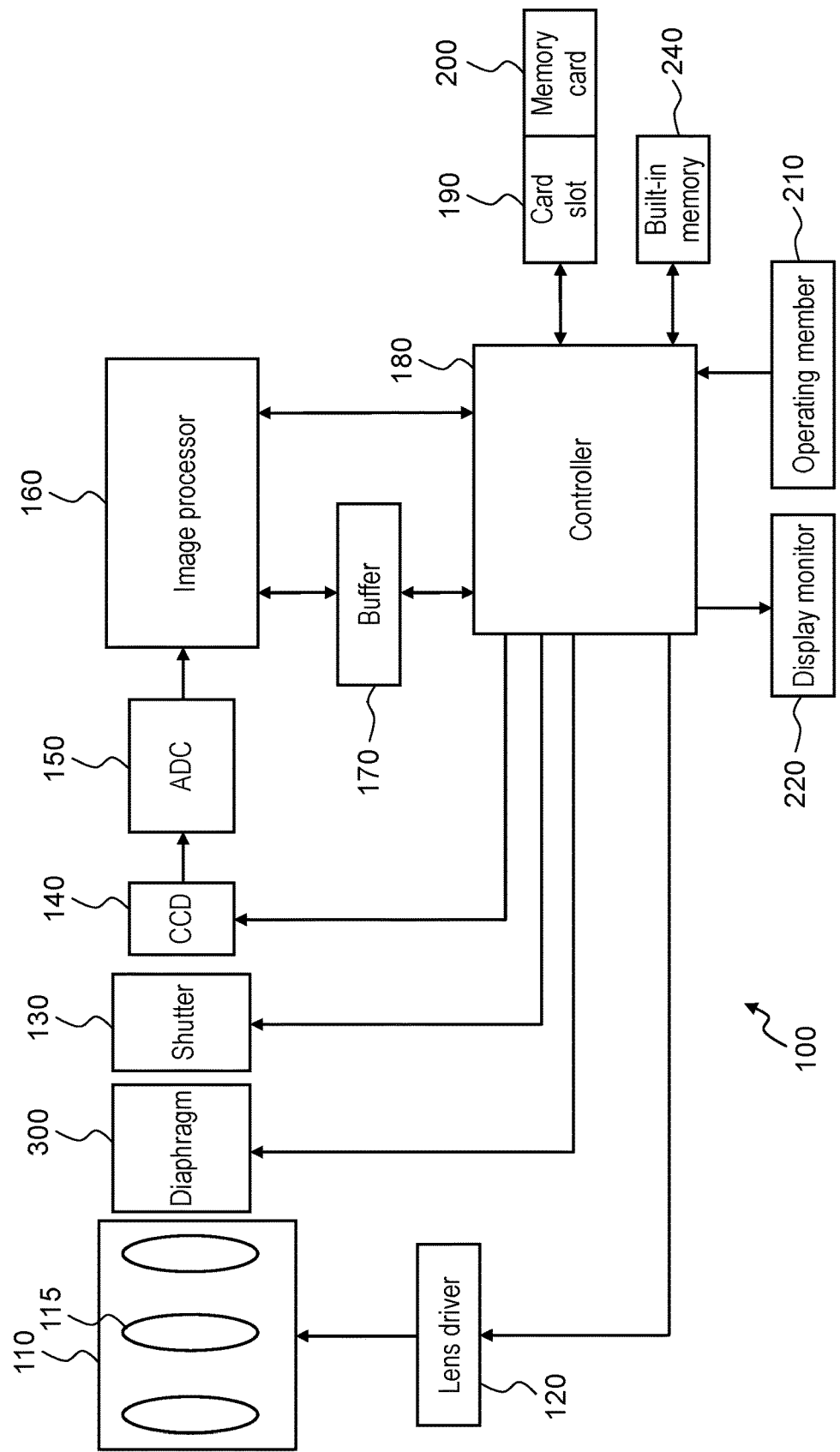
FIG. 1 is a diagram illustrating a configuration of a digital camera according to the present disclosure.

An example of an electric configuration of a digital camera according to a first exemplary embodiment will be described with reference to FIG. 1. FIG. 1 is a block diagram illustrating the configuration of digital camera 100. Digital camera 100 is an image pickup device that captures a subject image formed by optical system 110 including one or more lenses with charge-coupled device (CCD) 140.

Analog-digital converter (A/D converter) (ADC) 150 converts the image data generated by CCD 140 into digital image data. The image data generated with CCD 140 undergoes various processes performed by image processor 160 and is stored in memory card 200. The configuration of digital camera 100 will be described in detail below.

Optical system 110 includes a zoom lens and focus lens 115. Optical system 110 can enlarge or reduce the subject image by moving the zoom lens along an optical axis. In addition, optical system 110 can adjust focus of the subject image by moving focus lens 115 along the optical axis.

Lens driver 120 drives various lenses included in optical system 110. Lens driver 120 includes, for example, a zoom motor that drives the zoom lens and a focus motor that drives focus lens 115.

Diaphragm 300 adjusts a size of an aperture in response to user settings or automatically to adjust an amount of light that passes through the aperture.

Shutter 130 is a section that blocks light that passes through shutter 130 and reaches CCD 140. Shutter 130 constitutes an optical system section that controls optical information indicating the subject image together with optical system 110 and diaphragm 300.

CCD 140 captures the subject image formed by optical system 110 and then generates image data. CCD 140 includes a color filter, a light-receiving element, and an auto gain controller (AGC). The light-receiving element converts an optical signal concentrated by optical system 110 into an electric signal to generate image information. The AGC amplifies the electric signal that is output from the light-receiving element. CCD 140 further includes a drive circuit for performing various operations such as exposure, transfer, and electronic shutter. Details will be described later.

Analog-digital converter (A/D converter) (ADC) 150 converts the analog image data generated by CCD 140 into digital image data.

Image processor 160 performs various processes on the digital image data that is generated by CCD 140 and converted by A/D converter (ADC) 150. Image processor 160 operates in response to control performed by controller 180. Image processor 160 generates image data to be displayed on display monitor 220, and generates image data to be stored in memory card 200. For example, image processor 160 performs various processes, such as gamma correction, white balance correction, and flaw correction, on the image data generated by CCD 140. In addition, image processor 160 compresses the image data generated by CCD 140 in accordance with a compression format that complies with the H.264 standard, the Moving Picture Experts Group (MPEG) 2 standard, or the like. Image processor 160 can be implemented by a digital signal processor (DSP), a microcomputer, and the like.

Controller 180 is a control section that controls overall digital camera 100. Controller 180 can be implemented by a semiconductor device or the like. Controller 180 may be configured using only hardware and may be implemented by combining hardware and software. Controller 180 can be implemented by a microcomputer, a central processing unit (CPU), a microprocessor unit (MPU), an application specific integrated circuit (ASIC), a field-programmable gate array (FPGA), and the like.

Buffer 170 functions as a work memory for image processor 160 and controller 180. Buffer 170 can be implemented, for example, by a dynamic random access memory (DRAM) and a ferroelectric memory.

Card slot 190 allows memory card 200 to be detachable therefrom. Card slot 190 can be mechanically and electrically connected to memory card 200.

Memory card 200 contains a flash memory, a ferroelectric memory, or the like therein, and can store data such as image files generated by image processor 160.

Built-in memory 240 includes a flash memory, a ferroelectric memory, or the like. Built-in memory 240 stores a control program and the like for controlling overall digital camera 100.

Operating member 210 is a general term for a user interface that receives operations from a user. Operating member 210 includes, for example, a selection button, a decision button, a lever, a dial, and a touch panel, which receive the operations from the user.

Display monitor 220 can display an image (through image) indicated by the image data generated by CCD 140 and an image indicated by image data read from memory card 200. In addition, display monitor 220 can display various menu screens for performing various settings of digital camera 100 and the like. Display monitor 220 is configured with a liquid crystal display device or an organic electroluminescence (EL) display device.

Figure 2A:
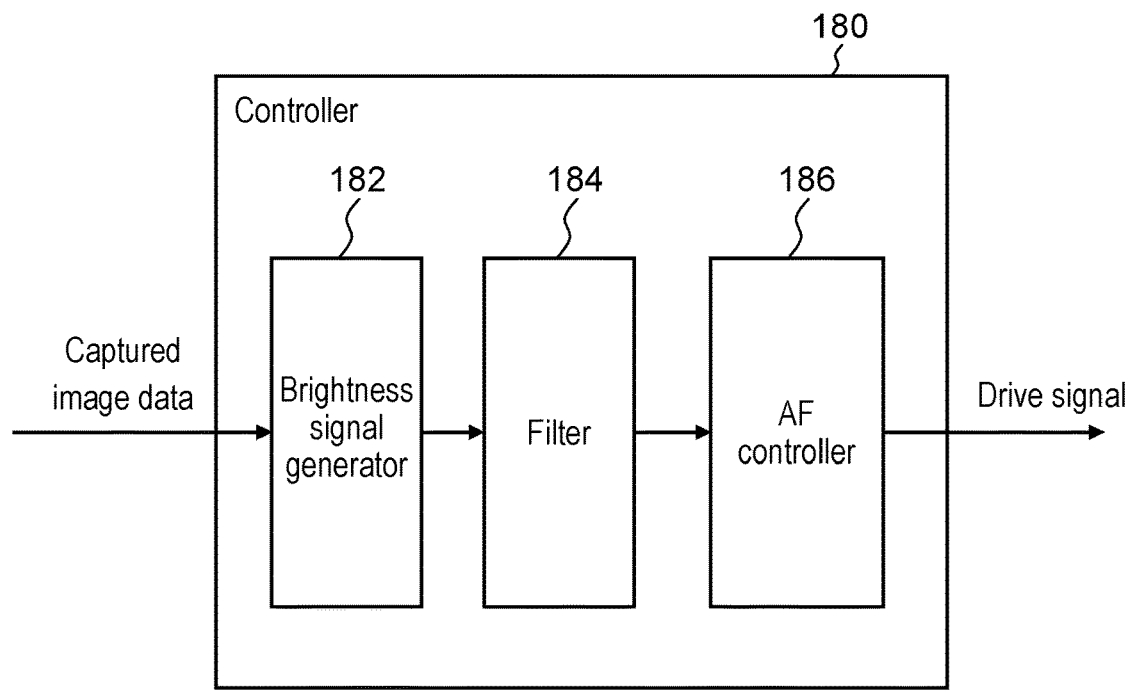
FIG. 2A is a diagram illustrating a configuration of functional blocks for implementing a function associated with an automatic focus operation in a controller of the digital camera.

FIG. 2A is a diagram illustrating a configuration of functional blocks for implementing a function associated with an automatic focus operation in controller 180 of digital camera 100. Controller 180 includes brightness signal generator 182, filter 184, and AF controller 186. Brightness signal generator 182 generates a brightness signal from captured image data. Filter 184 is a filter that extracts a spatial frequency component with a predetermined frequency band from the brightness signal generated by brightness signal generator 182. AF controller 186 calculates a contrast value from the brightness signal having the spatial frequency component with the predetermined frequency band, which is input from filter 184, and generates a drive signal for controlling lens driver 120 that drives focus lens 115. It is to be noted that brightness signal generator 182 and filter 184 may be disposed outside controller 180.

Figure 2B:
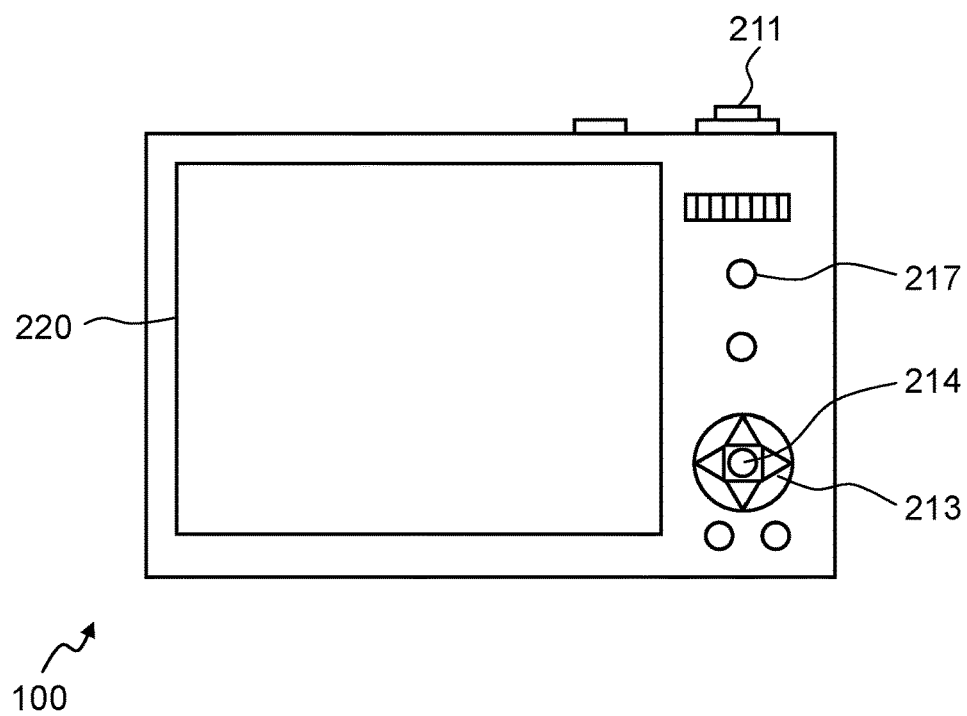
FIG. 2B is a rear view of the digital camera.

FIG. 2B is a diagram illustrating a rear of digital camera 100. As illustrated in FIG. 2B, operating member 210 includes release button 211, selection button 213, decision button 214, moving image recording button 217, and the like. When receiving operations from the user, operating member 210 sends various instruction signals to controller 180.

Release button 211 is a two-step depression-type button. When release button 211 is half-pressed by the user, controller 180 performs automatic focus control (AF control), automatic exposure control (AE control), and the like. Also, when release button 211 is fully pressed by the user, controller 180 records image data captured at timing of depression operation in memory card 200 or the like as a recorded image.

Selection button 213 is a depression-type button provided in up and down, left and right directions. By pressing selection button 213 of one of the up and down, left and right directions, the user can move a cursor or select various condition items displayed on display monitor 220.

Decision button 214 is a depression-type button. When decision button 214 is pressed down by the user while digital camera 100 is in a capturing mode or a playback mode, controller 180 displays a menu screen on display monitor 220. The menu screen is a screen for setting various conditions for capturing/playback. When decision button 214 is pressed down while a setting item of the various conditions is selected, controller 180 decides the setting of the selected item.

2. Operation of Digital Camera 2.1 AF Frame in Automatic Focus Operation

Digital camera 100 of the present exemplary embodiment has an automatic focus (AF) function that automatically focuses on the subject. Specifically, digital camera 100 performs an automatic focus operation by a contrast AF method. In other words, digital camera 100 calculates a contrast value from a captured image while moving focus lens 115 along the optical axis, and obtains a position of focus lens 115 where the calculated contrast value becomes maximum. Then digital camera 100 moves focus lens 115 to the obtained position to focus on the subject. Meanwhile, the contrast value is calculated from pixel values of pixels contained in an AF frame (AF region) set by the user or automatically, in the captured image.

Each of FIG. 3A, FIG. 3B, FIG. 4A, and FIG. 4B is a diagram illustrating an example of an AF frame set in the automatic focus operation of digital camera 100 of the present exemplary embodiment.

Figure 3A:
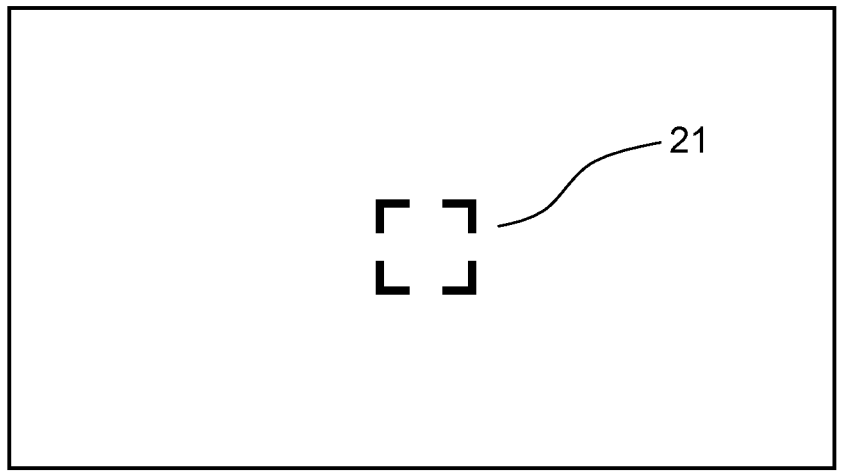
FIG. 3A is a diagram illustrating an AF frame in tracking AF, face recognition AF, and pupil recognition AF.
Figure 3B:
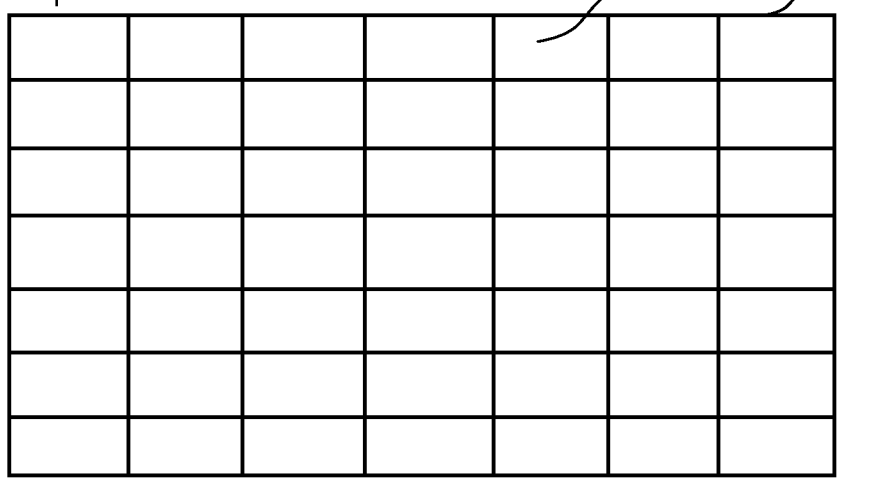
FIG. 3B is a diagram illustrating an AF frame in 49-points AF.

Each of FIG. 3A and FIG. 3B is a diagram illustrating an example of an AF frame used when brightness of the subject is high. FIG. 3A is a diagram illustrating an AF frame set in face recognition AF that detects a face of the subject and performs the automatic focus operation while following the detected face or in tracking AF that performs the automatic focus operation while following movement of the subject designated by the user. FIG. 3B is a diagram illustrating an AF frame set in 49-points AF that divides entire region 23 of the captured image into 49 (longitudinal seven regions× lateral seven regions) regions (AF frames 23a), and detects a contrast value in each of the divided regions (each of AF frames 23a) to obtain a position in focus. Digital camera 100 also has AF functions other than the tracking AF and the 49-points AF.

Figure 4A:
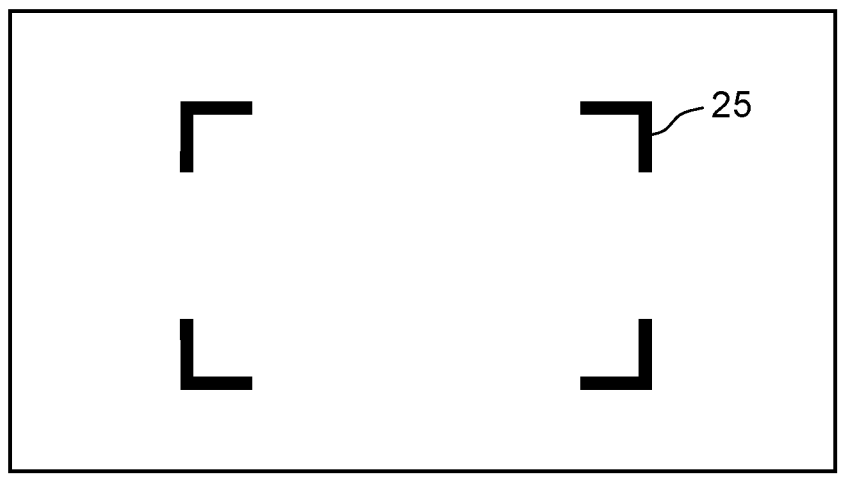
FIG. 4A is a diagram illustrating an AF frame in first low-illumination AF.
Figure 4B:
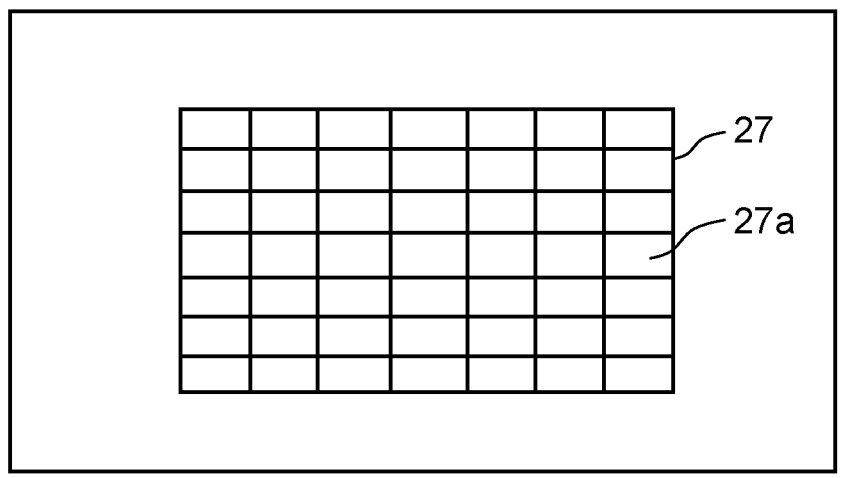
FIG. 4B is a diagram illustrating an AF frame in second low-illumination AF.

Each of FIG. 4A and FIG. 4B is a diagram illustrating an AF frame in low-illumination AF mode set when the brightness of the subject is lower than a predetermined value. Since the AF designated by the user is often failed due to a captured image with low illumination, digital camera 100 of the present exemplary embodiment is configured to be automatically switched to low-illumination AF when the automatic focus operation based on the AF mode designated by the user (the tracking AF, the face recognition AF, pupil recognition AF, one-point AF, or the like) is failed.

The low-illumination AF mode includes a first low-illumination AF mode and a second low-illumination AF. FIG. 4A is a diagram illustrating an AF frame set in the first low-illumination AF mode, and FIG. 4B is a diagram illustrating an AF frame set in the second low-illumination AF mode. Here, the first low-illumination AF mode is an AF function capable of automatically focusing on a dark subject as a whole, such as a night scene. The second low-illumination AF mode is a mode set when focusing is failed in the first low-illumination AF mode. The second low-illumination AF mode is suitable for capturing an image of a scene that has a low-illumination background as a whole but includes a bright subject in part, such as a night sky luminous with stars, or a dark night scene including small lights in a city. In the following description, an automatic focus operation performed in the first low-illumination AF mode is referred to as "first low-illumination AF", and an automatic focus operation performed in the second low-illumination AF mode is referred to as "second low-illumination AF".

AF frame 25 set in the first low-illumination AF mode illustrated in FIG. 4A (an example of the first AF frame) is set larger than AF frames 21, 23a illustrated in FIG. 3A, FIG. 3B. When the brightness of the subject (captured image) is low, an absolute value of the contrast value obtained from the image becomes low, and then its change becomes unclear. Therefore, in the first low-illumination AF mode set when the brightness of the subject is relatively low, the size of the AF frame is set larger so as to obtain a larger contrast value.

On the other hand, AF frame 27a set in the second low-illumination AF mode illustrated in FIG. 4B (an example of the second AF frame) is a region set by dividing predetermined region 27 into 49 regions. In particular, AF frame 27a in the second low-illumination AF mode is set as a smaller region than AF frames 21, 23a illustrated in FIG. 3A, FIG. 3B and AF frame 25 in the first low-illumination AF mode. A reason why AF frame 27a in the second low-illumination AF mode is set in this manner will be described below.

Figure 5A:
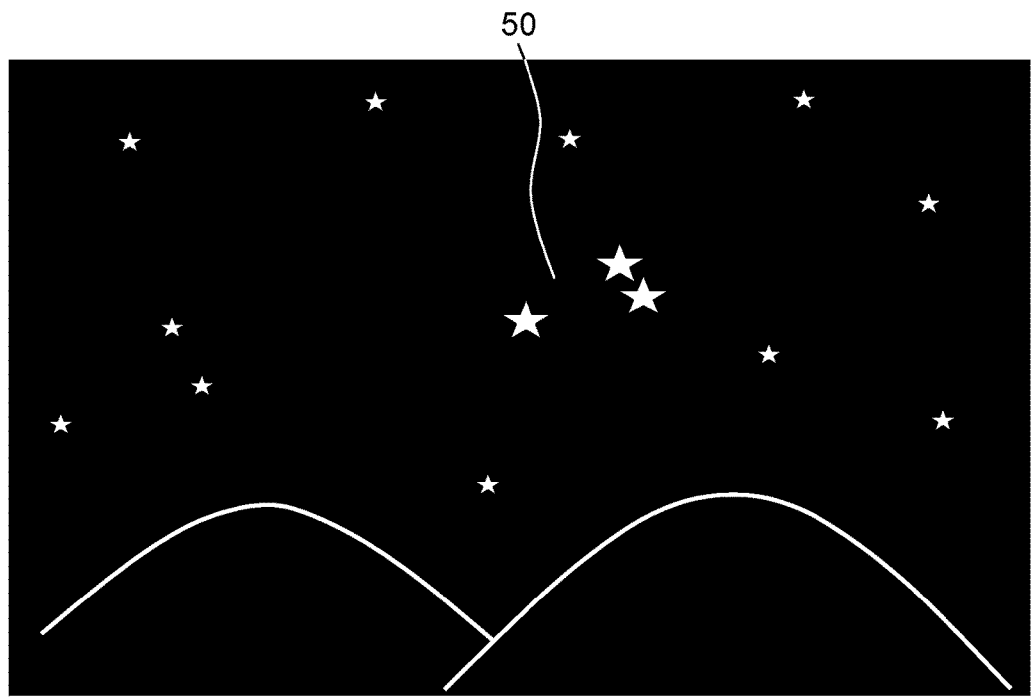
FIG. 5A is a diagram illustrating a subject that is a starry sky.
Figure 5B:
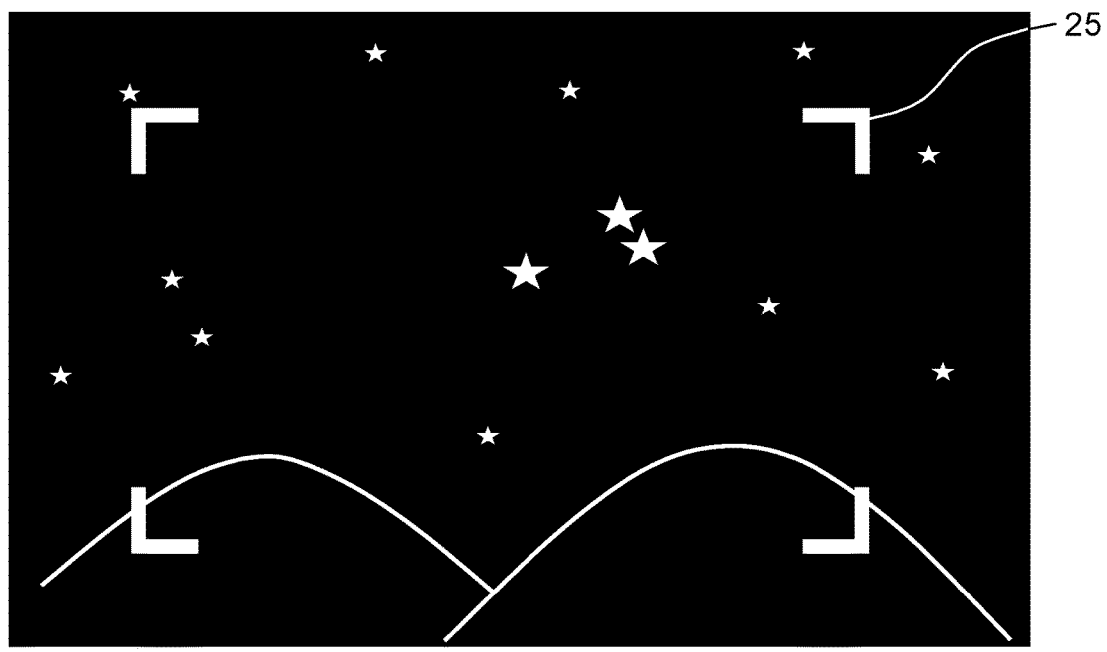
FIG. 5B is a diagram illustrating an AF frame in the first low-illumination AF for the subject that is the starry sky.
Figure 6:
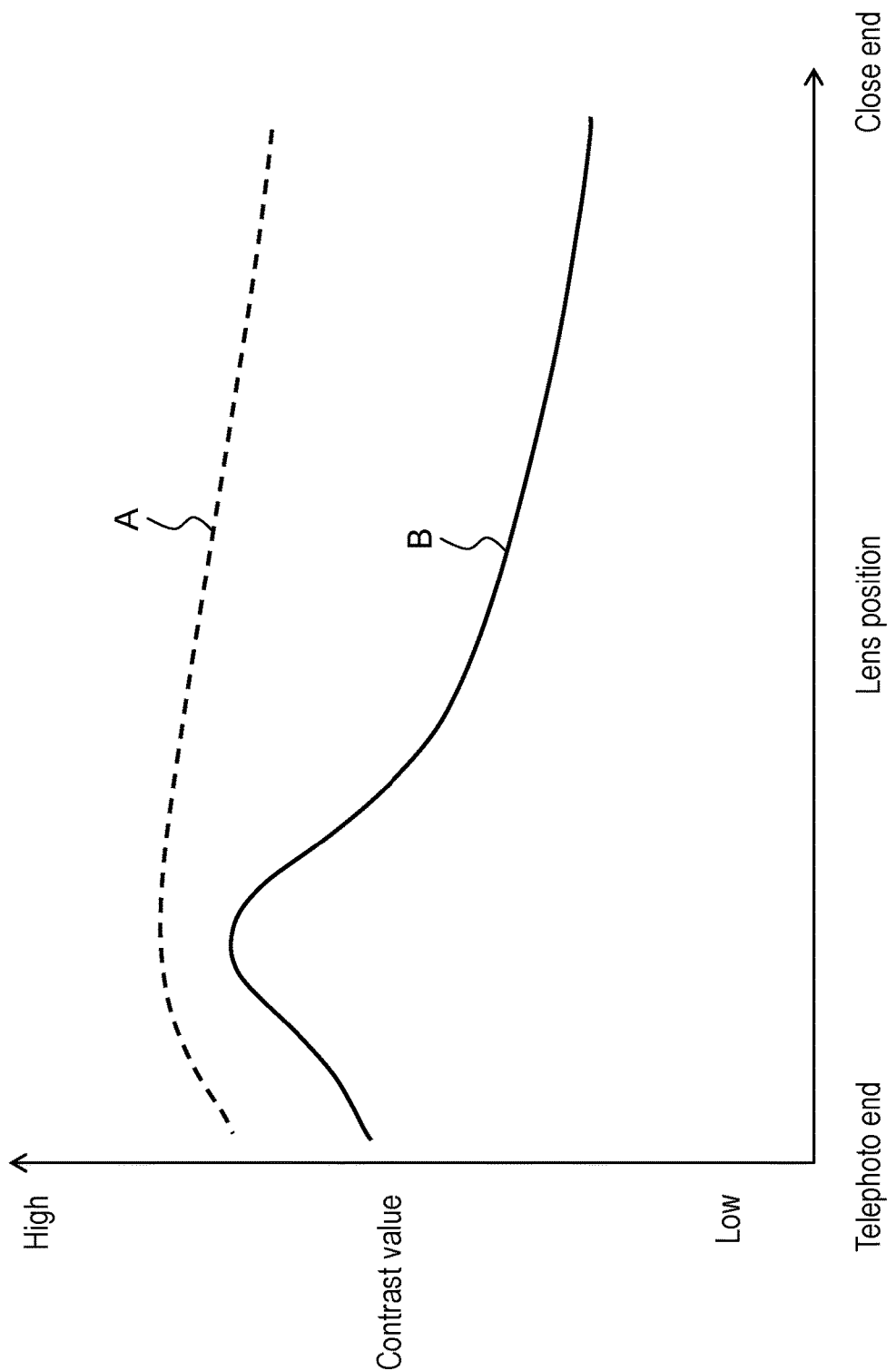
FIG. 6 is a diagram illustrating changes of contrast values to the subject that is the starry sky in contrast AF.

Consideration will be given to a case in which a background that is dark as a whole but includes bright stars in part is set as the subject as illustrated in FIG. 5A, and an image set with AF frame 25 in the first low-illumination AF mode as illustrated in FIG. 5B is captured. In this case, contrast values in the contrast AF change as indicated by dashed line A in FIG. 6. Specifically, although the contrast values change, brightness of the entire subject is low. This causes a small amount of the change of the contrast values (a difference between the minimum value and the maximum value in the contrast values). Unless the amount of the change of the contrast values is a predetermined value or more, the position in focus cannot be detected. Thus, in the case of dashed line A in FIG. 6, digital camera 100 cannot detect the position in focus.

The inventor of the present disclosure seriously examined this result and thus focused attention on a bright light source (for example, star 50) present in the dark background. In other words, when an image has low brightness as a whole, but includes the bright light source in part (for example, star 50), the inventor of the present disclosure examined whether a contrast value of the light source can be used. As a result, the inventor of the present disclosure has devised a method for setting AF frame 27a that is the smaller region although the image has the low illumination, as illustrated in FIG. 4B.

Figure 7:
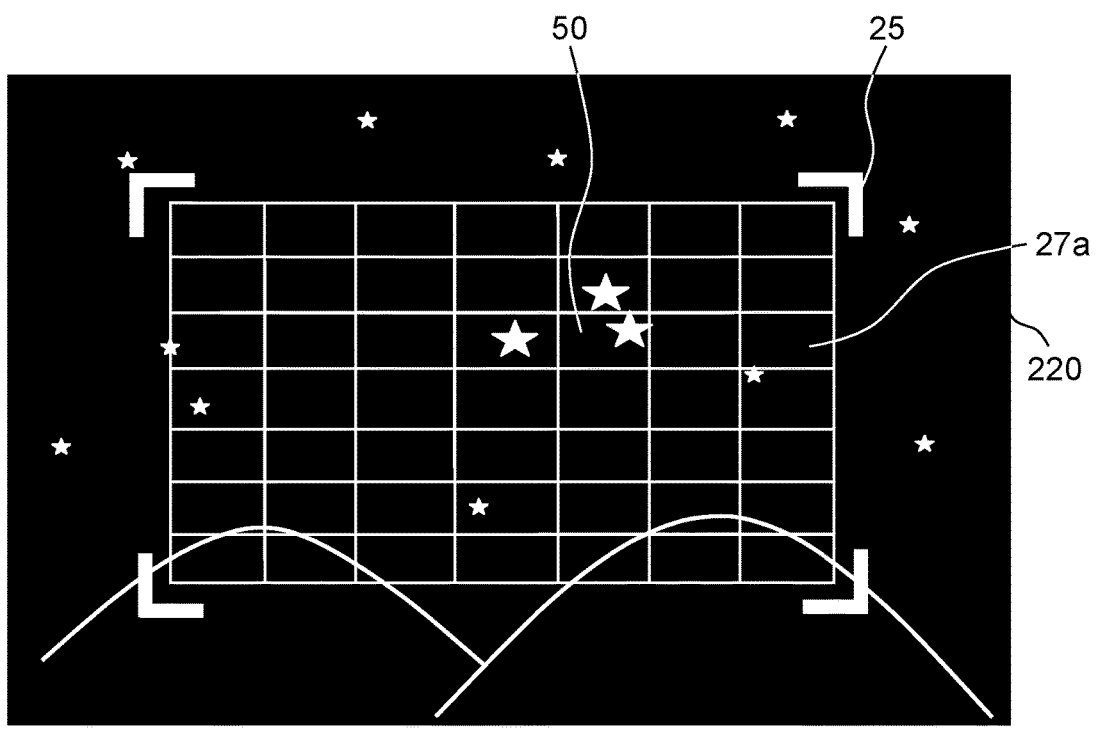
FIG. 7 is a diagram illustrating an AF frame set in low-illumination AF in the digital camera.

More specifically, as illustrated in FIG. 7, when AF frame 25 in the first low-illumination AF mode is used, even though the bright light source such as star 50 is included in part in a region of AF frame 25, an area of the light source (star 50) relative to the entire region of AF frame 25 is small. This reduces an impact of the brightness of star 50 on the contrast value of the entire region of AF frame 25. Therefore, as indicated by dashed line A in FIG. 6, even though star 50 that is the bright light source is contained in the image, the change of the contrast value becomes small. In contrast, since a region of AF frame 27a in the second low-illumination AF mode is small, the area of the light source (star 50) relative to the entire region of AF frame 27a becomes relatively large. This increases the impact of the brightness of star 50 on the contrast value of the entire region of AF frame 27a. Therefore, for AF frame 27a including star 50 that is the bright light source, the change of the contrast value caused by star 50 largely affects the change of the contrast value of the entire region of AF frame 27a, and the change of the contrast value appears more remarkably as indicated by solid line B in FIG. 6.

From the above respect, in the second low-illumination AF mode for low-illumination image capturing, the present exemplary embodiment uses AF frame 27a with the smaller size.

2.2 Automatic Focus Operation

Figure 8:
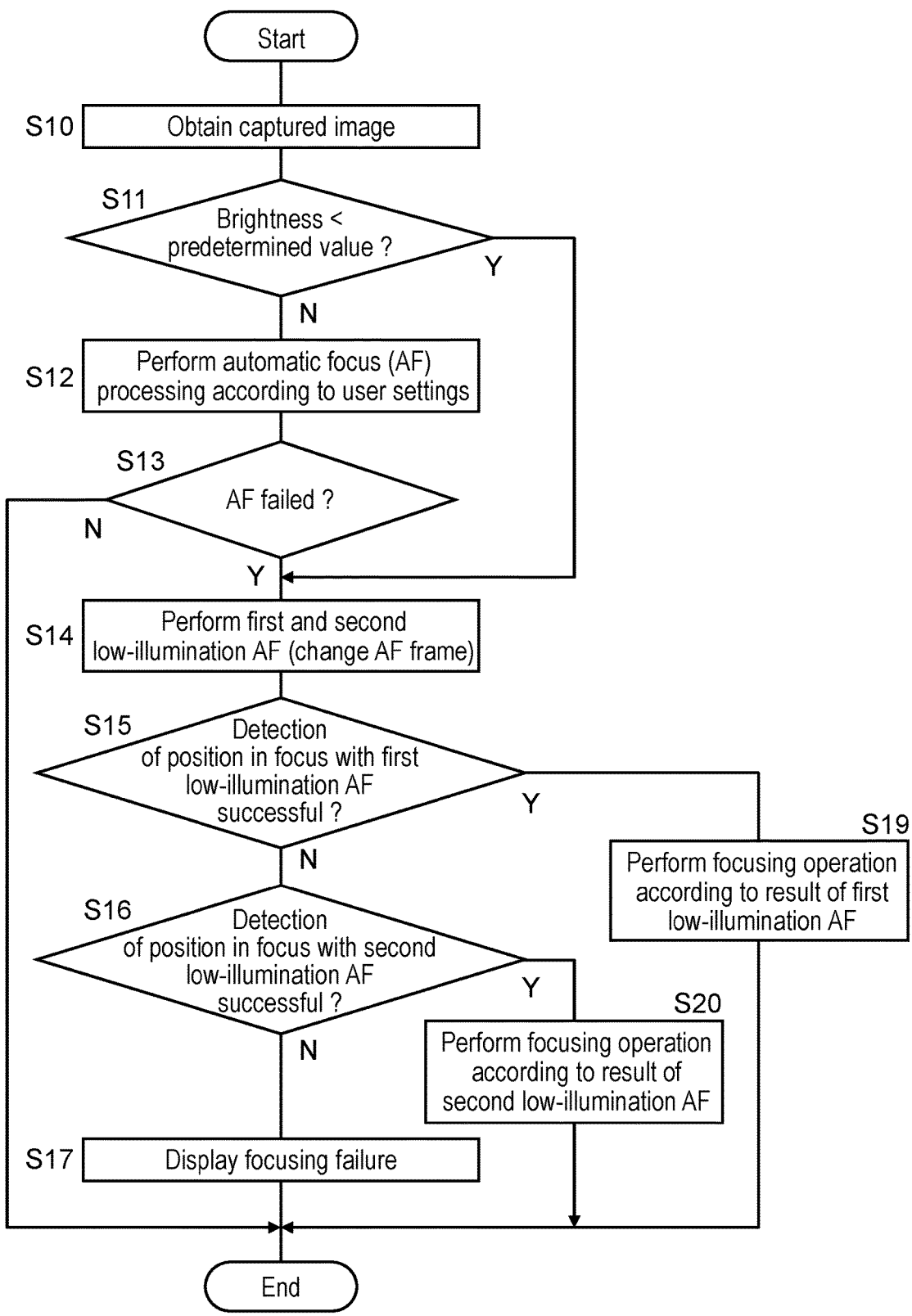
FIG. 8 is a flowchart illustrating the automatic focus operation in the digital camera.

With reference to a flowchart illustrated in FIG. 8, the automatic focus operation by digital camera 100 of the present exemplary embodiment will be described below. It is to be noted that, the following processing is performed by controller 180 of digital camera 100, and is started when release button 211 is half-pressed by the user.

Controller 180 obtains data of the captured image generated in CCD 140 (S10) and determines the brightness of the captured image (S11). When the brightness of the captured image is lower than a predetermined value, controller 180 proceeds to S14, and performs the first low-illumination AF and the second low-illumination AF. When the brightness of the captured image is the predetermined value or more, controller 180 performs the automatic focus operation according to the AF mode set by the user (S12). The AF mode set by the user includes the tracking AF, the face recognition AF, the pupil recognition AF, the one-point AF, and the like. AF modes other than the first and second low-illumination AF modes, such as the tracking AF, the face recognition AF, the pupil recognition AF, and the one-point AF, correspond to a normal illumination mode of the image pickup device of the present disclosure. For example, when the tracking AF is set by the user, AF frame 21 illustrated in FIG. 3A is set to perform the tracking AF.

Specifically, controller 180 calculates the contrast values from the region corresponding to the AF frame in the captured image, while moving focus lens 115 from a closest end to an infinity or in a direction opposite thereto. Controller 180 then obtains a position of focus lens 115 with the maximum contrast value as the position in focus. When the position in focus is obtained, controller 180 moves focus lens 115 to the position in focus.

As a result of the automatic focus operation thus performed, when the automatic focus operation is successful (NO in S13), the processing is terminated.

When the automatic focus operation is failed (YES in S13) or when the brightness of the captured image is lower than the predetermined value (YES in S11), controller 180 performs the first low-illumination AF and the second low-illumination AF in parallel (S14).

For example, while the tracking AF is set by the user, when the automatic focus operation with the tracking AF is failed and therefore the first and second low-illumination AF are started, as shown in part (a) of FIG. 9, characters "LOW" that indicate the low-illumination AF being presently performed is displayed below in-focus icon 31 that indicates the automatic focus operation being presently performed, on display monitor 220.

It is noted that, when the position in focus cannot be detected, it is determined that the automatic focus operation is failed. Here, with respect to the detection of the position in focus, when the maximum value (peak) in the contrast values is detected, and a difference between the maximum value and the minimum value in the contrast values is a predetermined value or more, it is determined that the position in focus is detected. Otherwise, it is determined that the position in focus cannot be detected and the automatic focus operation is failed.

Controller 180 then performs the first low-illumination AF using AF frame 25 illustrated in FIG. 4A, and performs the second low-illumination AF using AF frame 27a illustrated in FIG. 4B. In other words, controller 180 calculates the contrast values using AF frame 25 illustrated in FIG. 4A from the captured image and also calculates the contrast values using AF frame 27a illustrated in FIG. 4B from the captured image, while moving focus lens 115. Then, controller 180 obtains the position in focus for the case using AF frame 25 in the first low-illumination AF and the position in focus the case using AF frame 27a in the second low-illumination AF independently of each other.

Then controller 180 determines whether the position in focus is obtained from the first low-illumination AF using AF frame 25 (S15). At this time, when the maximum value (peak) in the contrast values calculated using AF frame 25 is detected, and the difference between the maximum value and the minimum value in the contrast values is the predetermined value or more, controller 180 determines that the position in focus is detected.

When the position in focus is detected from the first low-illumination AF (YES in S15), controller 180 moves focus lens 115 to the position in focus detected from the first low-illumination AF (S19). At this time, as illustrated in part (b) of FIG. 9, in-focus icon 33 that indicates the automatic focus operation being successful is displayed (lighted) on display monitor 220. In-focus icon 33 is, for example, displayed in a different color from that of in-focus icon 31. Further, AF frame 25 including a focused region is displayed.

On the other hand, when the position in focus is not detected from the first low-illumination AF (NO in S15), controller 180 determines whether the position in focus is detected from the second low-illumination AF (S16). A method for determining whether the detection of the position in focus from the second low-illumination AF is successful is the same as that of the first low-illumination AF described above.

When the position in focus is detected from the second low-illumination AF (YES in S16), controller 180 moves focus lens 115 to the position in focus detected from the second low-illumination AF (S20). It is to be noted that, in the second low-illumination AF, when a plurality of positions in focus is detected at a plurality of AF frames 27a, a position in focus on the infinity side may be, for example, used. At this time, as illustrated in part (c) of FIG. 9, characters "STAR" that indicate the second low-illumination AF, as well as in-focus icon 33 (lighted) that indicates the automatic focus operation being successful are displayed on display monitor 220. Further, AF frame 27a including the focused region is displayed.

On the other hand, when the position in focus is not detected from the second low-illumination AF (NO in S16), an indication that indicates the automatic focus operation not being successful is displayed on display monitor 220 (S17), and the automatic focus operation is terminated. For example, a color of the AF frame is changed or in-focus icon 33 is displayed with blinking.

It is to be noted that, characteristics of filter 184 used when the contrast value is calculated may be changed between the first low-illumination AF mode and the second low-illumination AF mode. FIG. 10 illustrates characteristics of filter 184 used when the contrast value is calculated in the first low-illumination AF and the second low-illumination AF. As illustrated in FIG. 10, the filter in the second low-illumination AF is arranged to have higher gain in a high frequency region than that of the first low-illumination AF, so as to more easily detect a high frequency region with high contrast. Generally, when the brightness of the subject is low, its contrast becomes low. Therefore, in the first low-illumination AF, the gain of the filter is set so as to more easily detect a low frequency region. In contrast, in the second low-illumination AF, the filter characteristic is set to have the higher gain in the high frequency region so as to detect the subject with high contrast such as the star in the night sky.

3. Advantageous Effects

Digital camera 100 of the present exemplary embodiment includes focus lens 115 and CCD 140 that captures the subject image formed through focus lens 115 and generates the captured image. Digital camera 100 further includes controller 180 that calculates the contrast value (an example of evaluation values) from the region corresponding to the AF frame in the captured image, and drives focus lens 115 according to the calculated contrast value to perform the automatic focus operation. Controller 180 includes the normal illumination mode set when the brightness of the captured image is the predetermined value or more, and the first low-illumination mode and the second low-illumination mode set when the brightness of the captured image is less than the predetermined value. AF frame 25 (the example of the first AF frame) to be set in the first low-illumination mode is larger than the AF frame set in the normal illumination mode. AF frame 27a (the example of the second AF frame) to be set in the second low-illumination mode is smaller than the AF frame 25.

As described above, since digital camera 100 of the present exemplary embodiment is set with the smaller AF frame in the second low-illumination AF mode, digital camera 100 can obtain the contrast value with the large change from the small light source. Therefore, digital camera 100 can detect the position in focus even when capturing the image of the scene that is dark as a whole but includes the small bright light source, such as the night sky luminous with the stars and can thus perform the automatic focus operation.

Other Exemplary Embodiments

As described above, the first exemplary embodiment has been described as illustration of technology to be disclosed in this application. The technology in the present disclosure however is not limited to the first exemplary embodiment, and may be applied to exemplary embodiments to which changes, replacements, additions, and omissions have been made as appropriate. Further, new exemplary embodiments can be configured by combining components described in the above-described first exemplary embodiment. Therefore, other exemplary embodiments will be illustrated below.

(1) In the above-described exemplary embodiment, digital camera 100 performs the first low-illumination AF and the second low-illumination AF in parallel after the automatic focus operation for the normal illumination is failed (S14), but may perform those separately. For example, digital camera 100 may first perform the first low-illumination AF, and may then perform the second low-illumination AF when the first low-illumination AF is failed.

Alternatively, when the brightness of the captured image is lower than the predetermined value or when AF processing other than the second low-illumination AF, which is performed first, is failed, digital camera 100 may perform only the second low-illumination AF. Alternatively, when a specific capturing mode (for example, a capturing mode suitable to capture an image of stars) is set, digital camera 100 may perform the second low-illumination AF.

(2) In the above-described exemplary embodiment, the described example differentiates the size of the AF frame and the filter characteristic between the first low-illumination AF and the second low-illumination AF, but other conditions may be differentiated. For example, a frame rate in the second low-illumination AF may be lower than that in the first low-illumination AF so as to obtain a larger contrast value. Alternatively, ISO sensitivity of the CCD (image sensor) in the second low-illumination AF may be higher than that of the first low-illumination AF and/or AF processing other than the first and second low-illumination AF.

(3) In the above-described exemplary embodiment, the description is made using a digital still camera as one example of the image pickup device, but the image pickup device is not limited to this example. An idea of the present disclosure is applicable to various image pickup devices capable of capturing moving pictures, such as a digital camcorder, a smartphone, and a wearable camera.

(4) In the above-described exemplary embodiment, the image sensor is configured with the CCD, but the image sensor is not limited thereto. The image sensor may be configured with an N-channel metal oxide semiconductor (NMOS) image sensor or a complementary metal oxide semiconductor (CMOS) image sensor.

(5) An idea disclosed in the above-described exemplary embodiments is applicable to both an interchangeable-lens camera and a lens integrated camera.

As described above, the exemplary embodiments have been described as the illustration of the technology in the present disclosure. For this purpose, the accompanying drawings and detailed description have been provided. Accordingly, the components described in the accompanying drawings and detailed description may include not only components essential for solving problems but also components unessential for solving problems, in order to illustrate the technology. Therefore, it should not be acknowledged immediately that those unessential components be essential because those unessential components are described in the accompanying drawings and detailed description. Also, since the above-described exemplary embodiments are intended to illustrate the technology in the present disclosure, various changes, replacements, additions, omissions, and the like may be made within the scope of the appended claims or equivalents thereof.

The present disclosure is applicable to various image pickup devices. Specifically, the present disclosure is applicable to the image pickup devices such as a digital still camera, a digital camcorder, a smartphone, and a wearable camera.

What is claimed is:

1. An image pickup device comprising:
an optical system;
an image pickup unit that captures a subject image through the optical system and generates a captured image; and
a controller that calculates an evaluation value from a region corresponding to an automatic focus (AF) frame in the captured image and drives the optical system according to the calculated evaluation value to perform an automatic focus operation,
wherein
the controller includes
a normal illumination mode set when brightness of the captured image is a predetermined value or more, and
a first low-illumination mode and a second low-illumination mode set when the brightness of the captured image is less than the predetermined value,
in the first low-illumination mode, a first AF frame that is larger than an AF frame set in the normal illumination mode is set, and
in the second low-illumination mode, a second AF frame that is smaller than the first AF frame is set.

2. The image pickup device according to claim 1, wherein a plurality of the second AF frames are set to the single captured image.

3. The image pickup device according to claim 1, wherein when the brightness of the captured image is less than the predetermined value or when an automatic focus operation in the normal illumination mode fails, the controller performs an automatic focus operation in the first low-illumination mode and an automatic focus operation in the second low-illumination mode in parallel.

4. The image pickup device according to claim 1, wherein when the brightness of the captured image is less than the predetermined value or when automatic focus operations in at least one of the normal illumination mode and the first low-illumination mode fail, the controller performs an automatic focus operation in the second low-illumination mode.

5. The image pickup device according to claim 1, wherein when a specific capturing mode is set, the controller performs an automatic focus operation in the second low-illumination AF mode.

6. The image pickup device according to claim 1, further comprising
a filter that extracts a signal component with a predetermined frequency band from a brightness signal in the captured image,
wherein
a characteristic of the filter used in the second low-illumination mode has higher gain for a high frequency component than gain for a high frequency component of a characteristic of the filter used in the first low-illumination mode.

7. The image pickup device according to claim 1, further comprising
a display unit that displays the captured image generated by the image pickup unit, in real time,
wherein
the controller displays an AF frame indicating a region to be automatically focused, by superimposing the AF frame on the captured image displayed on the display unit in real time.

* * * * *